United States Patent [19]

Kerko et al.

[11] 4,168,339

[45] Sep. 18, 1979

[54] PHOTOCHROMIC MICROSHEET

[75] Inventors: David J. Kerko; Jean-Pierre Odile; Candace J. Quinn; Paul A. Tick, all of Corning, N.Y.

[73] Assignee: Corning Glass Works, Corning, N.Y.

[21] Appl. No.: 927,956

[22] Filed: Jul. 26, 1978

[51] Int. Cl.$^2$ .................. B32B 7/02; B32B 27/36; G02B 3/00

[52] U.S. Cl. .................. 428/220; 65/DIG. 2; 106/53; 106/54; 106/DIG. 6; 350/205; 350/354; 351/163; 351/164; 351/165; 428/412; 428/426; 428/430; 428/913

[58] Field of Search .................. 351/163, 164, 165; 350/354, 205; 65/DIG. 2; 428/412, 426, 430, 220, 913; 106/53, 54, DIG. 6

[56] References Cited

U.S. PATENT DOCUMENTS

| | | | |
|---|---|---|---|
| 3,197,296 | 7/1965 | Eppler | 65/DIG. 2 |
| 3,208,860 | 9/1965 | Armistead | 350/354 |
| 3,252,374 | 5/1966 | Stookey | 106/DIG. 6 |
| 3,338,696 | 8/1967 | Dockerty | 65/DIG. 2 |
| 3,449,103 | 6/1969 | Stookey | 65/DIG. 2 |
| 3,682,609 | 8/1972 | Dockerty | 65/95 |
| 3,795,523 | 3/1974 | Moriya | 106/DIG. 6 |
| 3,833,511 | 9/1974 | Yamashita | 65/DIG. 2 |
| 4,018,965 | 4/1977 | Kerko | 428/410 |
| 4,035,527 | 7/1977 | Deeg | 350/354 |
| 4,130,437 | 12/1978 | Mazeau | 106/DIG. 6 |

Primary Examiner—Ellis P. Robinson
Attorney, Agent, or Firm—Clinton S. Janes, Jr.

[57] ABSTRACT

This invention is directed to the production of photochromic glass microsheet which is particularly useful in the fabrication of transparent glass-plastic composite lenses. In such lenses, the photochromic microsheet will either be buried within the plastic or will act as a surface layer thereon. The microsheet consists essentially, in weight percent on the oxide basis as calculated from the batch, of 54–66% $SiO_2$, 7–15% $Al_2O_3$, 10–30% $B_2O_3$, 3–15% $Na_2O$, 0.4–1.5% PbO, 0.2–0.5% Br, 0.5–1.2% Cl, 0.2–0.5% F, 0.008–0.03% CuO, and >0.03%–1% Ag.

10 Claims, No Drawings

PHOTOCHROMIC MICROSHEET

BACKGROUND OF THE INVENTION

Photochromic glasses or phototropic glasses, as such have also been termed, had their genesis in the U.S. in Patent No. 3,208,860. That patent defines a photochromic glass as having the capability of becoming darker, i.e., changing color, when exposed to actinic radiation and then returning to its original color when the actinic radiation is removed. Customarily, photochromic glass is sensitive to ultraviolet radiation and sometimes to the shorter wavelength portion of the visible spectrum. The patent teaches that such reversible optical properties can be imparted to glass by incorporating silver halide crystals into the glassy matrix. Thus, silver halide crystallites, i.e., crystallites containing AgCl, AgBr, and AgI, are developed in situ via heat treatment of the glass. As is explained in the patent, the mechanism of photochromism is grounded in the phenomenon that the silver halide crystallites, which are submicroscopic in size, are darkenable under the action of actinic radiation and thereby reduce the optical transmittance of the glass. However, when the source of actinic radiation is removed, the crystallites fade to their initial state, restoring the optical transmittance to its original level. The sequence of darkening and fading can be repeated indefinitely under ambient conditions without fatigue or loss of photochromic properties.

U.S. Pat. No. 3,208,860 refers generally to silicate-based host glasses, with the preferred compositions ranging within the $R_2O-Al_2O_3-B_2O_3-SiO_2$ field. The preferred base glass compositions are stated to consist essentially, expressed in weight percent on the oxide basis, of about 4–26% $Al_2O_3$, 4–26% $B_2O_3$, 40–76% $SiO_2$, and 4–26% $R_2O$, wherein $R_2O$ is selected from the group of 2–8% $Li_2O$, 4–15% $Na_2O$, 6–20% $K_2O$, 8–25% $Rb_2O$, and 10–30% $Cs_2O$, the sum of those components constituting at least 85% of the total composition. To achieve photochromic behavior, the patent discloses adding at least one halide in at least the minimum effective amount of 0.2% Cl, 0.1% Br, and 0.08% I and adding silver in at least the minimum indicated proportion of 0.2% where Cl is the effective halide, 0.05% where Br is the effective halide, and 0.03% where I is the effective halide. Where a transparent glass is desired, the silver content will be maintained below 0.7% and the halide content less than 0.6%. Finally, the patent notes the advantage of including small amounts of low temperature reducing agents, such as SnO, FeO, CuO, $As_2O_3$, and $Sb_2O_3$, to improve the photochromic properties.

The most extensive application to date for photochromic glass has been in the fabrication of ophthalmic lenses, both as prescription lenses and as non-prescription sunglasses. One example of that utility can be found in U.S. Pat. No. 3,197,296 which describes a group of refractive index-corrected silicate glasses containing silver halide crystals to impart the desired photochromic character. In the conventional 2 mm thickness, those glasses exhibited desirable photochromic properties and possessed the necessary refractive index to be compatible with lens grinding practices conventional in the production of prescription ophthalmic lenses.

Prescription lenses, marketed under the trademark PHOTOGRAY ® by Corning Glass Works, Corning, N.Y., have comprised the largest portion of commercial sales. That glass has the approximate composition recited below in weight percent:

| | |
|---|---|
| $SiO_2$ | 55.6% |
| $B_2O_3$ | 16.4 |
| $Al_2O_3$ | 8.9 |
| $Li_2O$ | 2.65 |
| $Na_2O$ | 1.85 |
| $k_2O$ | 0.01 |
| BaO | 6.7 |
| CaO | 0.2 |
| PbO | 5.0 |
| $ZrO_2$ | 2.2 |
| Ag | 0.16 |
| Cu | 0.035 |
| Cl | 0.24 |
| Br | 0.145 |
| F | 0.19 |

Because the composition of PHOTOGRAY ® lenses represents compromises made between photochromic characteristics, ophthalmic properties, the capability for being chemically strengthened, as well as melting and forming capability, extensive research has been continuous to provide a glass demonstrating improved photochromic behavior while still retaining the other physical attributes demanded in the production of ophthalmic lenses.

The dynamics of photochromic behavior are quite complex. For example, a photochromic glass will customarily darken to a lower transmittance when the exposure to actinic radiation occurs at lower temperatures. Moreover, where solar radiation constitutes the actinic radiation, the intensity thereof can vary widely depending upon the time of year, the location of the exposure (angle of declination of the sun), cloud cover, snow cover, air mass value, etc. Moreover, whereas the known photochromic glasses do not strictly conform to Bouguer's Law, because of the absorption of the actinic radiation by the photochromic particles in the glass, the transmittance of a darkened photochromic glass specimen is related in part to the thickness thereof. Thus, where other parameters are held constant, a thicker sample of photochromic glass will normally get darker than a specimen of thin dimensions.

In recent years there has been considerable interest in glass-plastic composite articles and, particularly in the ophthalmic industry, for composite glass-plastic lenses. There are a number of plastics having densities substantially less than glass. As a result, in both the prescription and non-prescription sunglass markets, plastics have seen increasing service since the lightness thereof causes less discomfort to the wearer and has permitted the merchandising of lenses of larger area since the weight, when compared to glass, is much less. Nevertheless, plastic lenses have one drawback which has limited their universal acceptance. Thus, the surfaces of plastic lenses do not possess the surface hardness of glass and, hence, are susceptible to being scratched. Therefore, care must be exercised in handling such lenses. Also, but less importantly, plastics do not exhibit the heat resistance and chemical durability of glass. Accordingly, efforts have been undertaken to produce transparent glass-plastic composite lenses wherein the body of the lens would consist of plastic but at least one surface thereof, conventionally the surface of the lens away from the wearer's face, would have a thin skin of glass laminated thereto. Such a glass surface can provide the desired resistance to surface abrasion, heat resistance, and chemical durability lacking in the plastic. And the resulting composite article would be lighter than a lens formed from glass alone.

Numerous attempts have been made to produce photochromic articles from plastic materials and such articles have been produced. Unfortunately, however, the resultant products have not been practical for use as ophthalmic lenses because each has relatively quickly succumbed to fatigue, i.e., the reversible character of darkening and lightening when subjected to and removed from solar radiation was lost after a few such cycles.

Such results led to research to fabricate glass-plastic composite lenses wherein the glass layer(s), either buried within the plastic or present on the surface, would consist of photochromic glass. Problems in forming glass-plastic composite lenses were legion, particularly with respect to delamination, incomplete bonding, and stress-induced birefringence among others. A successful method for producing sound, transparent glass-plastic composite lenses having a glass surface layer was developed, however, in U.S. application Ser. No. 848,442, filed Nov. 14, 1977 by A. A. Spycher. That application discloses a direct casting method for bonding a glass element to a high-shrinkage thermosetting plastic element whereby the bonding between the elements is secure and the residual stress therebetween is very low. The method comprehends four general steps:

(a) a surface portion of the glass member is coated with a themoplastic adhesive, e.g., polyvinyl butyral, having a heat sealing temperature above the minimum curing temperature of the thermosetting plastic;

(b) casting the thermosetting plastic, e.g., an allyl diglycol carbonate, in liquid form against said surface portion of the glass member which had been coated with the thermoplastic adhesive;

(c) curing the thermosetting plastic by heating the plastic, the glass member, and the thermoplastic adhesive to a temperature below the heat sealing temperature of the thermoplastic adhesive but above the minimum curing temperature of the thermosetting plastic; and then (d) consolidating the cured thermosetting plastic, the thermoplastic adhesive, and the glass member into an integral glass-plastic composite lens by heating to a temperature above the heat sealing temperature of the thermoplastic adhesive.

Where the microsheet is to be buried within the plastic to form an internal lamina, a similar process to that described above can be employed with slight modifications. Thus:

(a) a predetermined portion of the thermosetting plastic is cast in liquid form against a mold surface finished to optical quality;

(b) a glass microsheet member having surface portions coated with a thermoplastic adhesive exhibiting a heat sealing temperature above the minimum curing temperature of the thermosetting plastic is placed in contact with the liquid plastic;

(c) a further predetermined portion of the thermosetting plastic is cast in liquid form against said glass member;

(d) the thermosetting plastic is cured by heating to a temperature below the heat sealing temperature of the thermoplastic adhesive but above the minimum curing temperature of the thermosetting plastic; and therafter (e) the cured thermosetting plastic, the thermoplastic adhesive, and the glass member are consolidated into an integral glass-plastic composite lens by heating to a temperature above the heat sealing temperature of the adhesive.

Glass-ceramic molds of the type disclosed in U.S. application No. 839,484, filed Oct. 5, 1977 by A. A. Spycher, are especially suitable for this purpose.

The standard thickness of prescription ophthalmic lenses is about 2 mm (~0.080"). In a glass-plastic composite lens to be used for opthalmic purposes, the glass portion will have a refractive index matching that of the plastic and will desirably have a thickness dimension no more than about 0.5 mm (~0.20") with a lower limit of thickness of about 0.25 mm (~0.010"). A thermosetting plastic exhibiting excellent optical properties and which has been utilized extensively in opthalmic applications under the trademark CR-39 ® resin is made from diethylene glycol bis(allyl carbonate) resin and marketed by PPG Industries, Inc., Pittsburgh, PA. That plastic is operable in the above-disclosed method for preparing glass-plastic composite lenses.

In the conventional method for fabricating glass ophthalmic lenses, glass blanks of optical quality are pressed from a melt of molten glass and the blanks are then ground and polished to specified prescriptions. Inasmuch as the thickness of the glass microsheet portion of the glass-plastic composite lens is so small as to have little effect upon the lens prescription, the grinding and polishing of glass lens blanks would be wasteful of both time and material. Hence, it would be far less costly to produce optical quality sheet of photochromic glass having the desired thickness from which shapes of desired configurations and dimensions could be cut for subsequent lamination with plastic.

The making of glass sheet is well known to the art. For example, drawing processes are available which form glass sheet directly from a melt where the glass sheet surfaces are not contacted by mold or roller surfaces until after the glass has cooled to the necessary extent to resist surface marking. Such sheet draw processes include the Colburn process, the Fourcault process, and the Pittsburgh Plate or Pennvernon process. Those methods employ rollers to draw the sheet up from the molten glass but can yield glass of near-optical quality and without substantial surface marking in thicknesses down to about 1.5 mm (~0.060"). U.S. Pat. Nos. 3,338,696 and 3,682,609 describe downdraw sheet-forming processes which are especially suitable for the production of very thin, lightweight glass sheet wherein careful control can be had in the forming of uniformly thin microsheet of optical quality.

Unfortunately, however, none of the above sheet drawing procedures provides the rapid melt quenching action inherent in conventional glass pressing practices. Consequently, the sheet drawing processes present a problem for producing haze-free, highly-darkenable photochromic glass sheet. Moreover, by their very nature each of the processes involves maintaining substantial volumes of glass at relatively low temperatures to secure acceptable sheet-forming viscosities in the $10^4$–$10^6$ range. The molten glass will also be in extended contact with the refractory metals or ceramics which provide the means for forming the drawn sheet. In sum, the sheet-forming processes impose severe constraints on glass composition because of glass stability and liquidus problems intrinsicly associated with the handling and processing of molten glass at rather low temperatures and high viscosities.

Specifically, the glass must possess a viscosity at its liquidus temperature of at least $10^4$ poises and, preferably, about $10^5$ poises. Furthermore, the glass melt must demonstrate long term stability against devitrification and interfacial crystallization in contact with refractory metals and ceramics such as platinum, mullite, sillimanite, zircon, and high density alumina-containing refractories which have been used to contain and/or form molten glass. This stability should be maintained down to temperatures where the glass exhibits a viscosity between about $10^4-10^6$ poises, the range of viscosities at which the glass is customarily formed.

Methods for sheet drawing photochromic glass have been described in U.S. Pat. Nos. 3,449,103 and 4,018,965 and West German Pat. No. 2,125,232. Neither U.S. Pat. No. 4,018,965 nor West German Pat. No. 2,152,232 deals with the formation of microsheet, i.e., glass having a thickness dimension no greater than about 0.5 mm. U.S. Pat. No. 3,449,103 refers to glass sheet of microsheet thickness but employs contact chilling, e.g., through metal rollers, to quench the melt. Such a process cannot yield optical quality glass sheet of uniform thickness and essentially free from surface defects.

As was observed above, although photochromic glasses do not strictly conform to Bouguer's Law, where other parameters are maintained constant, a thicker specimen of glass will commonly get darker than one of thinner cross section. It will be recognized that where microsheet is involved, i.e., the thickness dimension is no greater than about 0.5 mm, the efficiency of darkening exhibited by a particular photochromic glass must be very high to yield an essentially haze-free product displaying a darkened transmittance of less than about 50% at room temperature. Thus, the composition of the glass must be such that a relatively high percentage of crystallinity is developed, but the size of the crystallites is retained at a low value such as to inhibit the occurrence of haze or cloudiness resulting from diffusion of light passing through the glass. The glass composition is also important in achieving a refractive index in the glass which matches or very closely approximates the plastic material of the composite lens. Moreover, the glass composition plays a vital role in the rate at which the darkening of the glass fades away when the source of actinic radiation is removed.

Objective of the Invention

The primary objective of the instant invention is to provide transparent photochromic glass in the form of microsheet having a cross-sectional thickness between about 0.25 mm-0.50 mm (~0.010"-0.020") which exhibits the following properties:

(a) the capability of darkening at room temperature in the presence of actinic radiation to a luminous transmittance of less than 50% and, preferably, less than 45%;

(b) the capability of fading from the darkened condition at room temperature at least 20 percentage units and, preferably, more than 25 percentage units within five minutes after removal from actinic radiation;

(c) the capability of fading from the darkened condition at room temperature to a luminous transmittance in excess of 80% in no more than one hour after being removed from the actinic radiation;

(d) a liquidus temperature less than the temperature at which the glass displays a viscosity of $10^5$ poises;

(e) long term stability against reaction (with consequent crystallization) when in contact with platinum and such refractory ceramics as mullite, sillimanite, zircon, and high density alumina-containing bodies at temperatures corresponding to glass viscosities in the range of about $10^4-10^5$ poises; and (f) good chemical durability.

SUMMARY OF THE INVENTION

We have found that the above objective can be achieved utilizing glass compositions consisting essentially, in weight percent on the oxide basis as calculated from the batch, of about 54-66% $SiO_2$, 7-15% $Al_2O_3$, 10-30% $B_2O_3$, 3-15% $Na_2O$, 0.4-1.5% PbO, 0.2-0.5% Br, 0.5-1.2% Cl, 0.2-0.5% F, 0.008-0.030% CuO, and >0.03%-1.0% Ag. Various optional ingredients can be added including 0-4% $Li_2O$ and 0-10% $K_2O$, but the sum of $Li_2O + Na_2O + K_2O$ will not exceed about 15%, 0-3% $P_2O_5$, 0-1% I, and 0-0.5% CdO. Well-known glass colorants may also be included, if desired, such colorants being selected in the indicated proportions from the group consisting of 0-1% total of transition metal oxide colorants and 0-5% total of rare earth oxide colorants. Obviously, the presence of such colorants will reduce the clear luminous transmittance of the glass. Such practice is, of course, well known to the art and comprises no part of the instant invention.

The glasses exhibit viscosities at the liquidus temperature of about $10^4-10^5$ poises, thereby yielding a liquidus-viscosity relationship compatible with direct sheet drawing from the melt utilizing the methods disclosed in U.S. Pat. Nos. 3,338,696 and 3,682,609. The glasses also demonstrate long term stability against reaction and devitrification in contact with platinum and refractory ceramics such as mullite, sillimanite, zircon, and high density alumina-containing bodies at temperatures equivalent to glass viscosities in the range of about $10^4-10^5$ poises. That capability permits the melt to be drawn at those viscosities against such materials to give glass sheet of optical quality. As employed in the present context, long term stability against devitrification contemplates resistance to the growth of surface crystals in contact with refractory materials, a growth of a layer of crystals of less than about 10 microns in thickness at the glass-refractory interface over a period of 30 days at glass viscosities of about $10^4-10^5$ poises being considered to exemplify good resistance to crystal growth.

The glasses of the invention exhibit excellent chemical durability. As defined herein, such resistance indicates that the glasses evidence no formation of a surface film or iridescence when immersed for ten minutes into a 10% by weight aqueous solution of HCl at 25° C.

The luminous transmittance of a glass, as utilized in the instant description, is expressed as the value Y defined in terms of the 1931 C.I.E. trichromatic colorimetric system using the light source Illuminant C. This colorimetric system and light source are described in the *Handbook of Colorimetry*, A. C. Hardy, Technology Press, M.I.T., Cambridge, Mass. (1936). Furthermore, this disclosure considers that the clear or undarkened state is secured by means of an overnight fading (at least eight hours) of the glass in the absence of light. A somewhat more transmitting glass (a transmittance of 2-3 percentage points higher) can be achieved via immersing the glass in boiling water for about five minutes.

The method of the present invention comprises the following steps:

(a) a glass-forming batch of the proper composition is melted;

(b) the melt is adjusted in temperature to impart a viscosity thereto of about $10^4$–$10^5$ poises; and then (c) the melt within that range of viscosities is drawn past refractory forming means in a downdraw process such as is described in U.S. Pat. Nos. 3,338,696 and 3,682,609 to produce potentially photochromic glass microsheet having a thickness between about 0.25 mm–0.50 mm.

Potentially photochromic glass is defined in this description of the invention as glass including silver halide-containing crystals and sensitizing agents or activators, such as copper oxide, which can be rendered photochromic by means of a predetermined heat treatment subsequent to the forming step.

U.S. application Ser. No. 895,646, filed Apr. 12, 1978 now U.S. Pat. No. 4,130,437 by Mazeau and Seward, discloses forming potentially photochromic glass sheet utilizing conventional updraw and downdraw processes. That application is directed to glass sheet generally having a cross section between about 1.3–1.7 mm. The compositions cited are similar to, but inoperable in, the instant invention. Thus, the glasses of that application consist essentially, in weight percent on the oxide basis as calculated from the batch, of about 54–66% $SiO_2$, 7–15% $Al_2O_3$, 10–25% $B_2O_3$, 0.5–4.0% $Li_2O$, 3.5–15% $Na_2O$, 0–10% $K_2O$, 6–16% total of $Li_2O$+$Na_2O$+$K_2O$, 0–1.25% PbO, 0.10–0.3% Ag, 0.2–1.0% Cl, 0–0.3% Br, 0.002–0.02% CuO, and 0–2.5% F. The primary compositional distinction between those glasses and those of the instant invention resides in the higher Ag content with the quantities of PbO, halides, and CuO also being generally higher. These changes in composition were necessary to achieve the desired darkened transmittance below 50% and to provide a refractive index matching that of the plastic member of the lens composite.

An ultraviolet lamp has been customarily used in the past as a convenient source of actinic radiation to examine the photochromic behavior of glass samples, inasmuch as it has been known that photochromic glasses were primarily activated by radiations in the ultraviolet and shorter wavelength visible portions of the spectrum. Frequently, however, poor correlation has been seen between the data gathered with the ultraviolet lamp and the values obtained from solar radiation measurements made outdoors. Accordingly, in order to obtain better correlation with outdoor solar radiation exposure, a "solar simulator" was designed for the determination of the luminous transmittance Y.

The solar simulator apparatus is described in U.S. application Ser. No. 839,496, filed Oct. 5, 1977 now U.S. Pat. 4,125,775 by Chodak. The basis of the apparatus is a 150 watt xenon arc source fitted with a filter to modify the spectral output thereof so as to closely approximate the solar spectrum, especially in the ultraviolet, blue, and red portions thereof. The infrared region of the spectrum is attenuated with a stream of water of sufficient thickness to provide equal irradiance to that of the sun, but with no particular regard for the spectral distribution within that region.

The intensity of the arc source was adjusted such that the amount of darkening resulting from exposure to the light source was essentially identical to that of a number of commercially available photochromic glasses, including PHOTOGRAY ® lenses, darkened outdoors at noon during a cloudless early summer day in Corning, New York (air mass value of 1.06). Numerous experimental photochromic glasses of widely variant compositions were also subjected to the solar simulator and to outdoor sunlight. Good overall agreement was observed in comparisons between the two types of measurements.

In order to continuously monitor the darkened transmittance of the specimens, each sample was interrogated with a chopped beam of light from a tungsten-halogen lamp detected by a PIN silicon photodiode whose output was demodulated via a lock-in amplifier. A composite color filter was placed into the beam so that the product of the light's spectral output, the silicon detector sensitivity, and the filter transmittance would closely approximate the spectral sensitivity of the human eye.

This apparatus was interfaced to a PDP-11/04 computer (marketed by Digital Equipment Corporation, Maynard, Mass.) to enable automatic sample change, temperature selection, event sequencing, and data collection, storage, reduction, and retrieval with a minimum of operator's involvement.

Description of Preferred Embodiments

In order to insure achieving the desired photochromic, physical, and chemical characteristics in the glass plus the melting and forming properties necessary for downdrawing microsheet, the compositional parameters of the glass must be followed closely. Moreover, the addition of optional ingredients which may improve, for example, the melting and forming capabilities of the glass must be strictly monitored to avoid possible adverse effects upon the photochromic or physical properties of the glass.

As illustrative of the care that should be exercised in observing the compositional limitations, the level of the alkali metal oxides requires control because of their effect upon photochromic behavior. The inclusion of $Li_2O$ in the composition can be useful in adjusting the refractive index of the glass but quantities of $Li_2O$ in excess of about 4% by weight lead to decreased glass stability against platinum metal and refractory ceramics when the molten glass is in the viscosity range of about $10^4$–$10^5$ poises. Such instability gives rise to crystallization with consequent haze in the glass. Where less than the prescribed amounts of $Na_2O$ and $K_2O$ are included, the capability of the glass to undergo photochromic darkening is impaired. Concentrations of alkali metal oxides in excess of the total specified appear to reduce the rate of fading demonstrated by the glass after removal from the actinic radiation.

The combination of $Al_2O_3$+$B_2O_3$ in the glass appears to counter the deleterious effect which the alkali metal oxides exert upon the rate of fading. Accordingly, glasses containing less than the stated amounts of those constituents will commonly demonstrate less desirable photochromic behavior. However, the presence of greater than about 30% by weight $B_2O_3$ acts to reduce the chemical durability of the glass. Concentrations of $Al_2O_3$ in excess of 15% by weight tend to decrease the resistance of the glass against devitrification, the added $Al_2O_3$ appearing to combine with $Li_2O$, where present, to yield spodumene solid solution crystals.

PbO is believed to be of substantial significance in determining the character of the photochromic properties of the glass. Thus, the presence of PbO in an amount of at least 0.5% imparts a definite improvement in darkenability. The rate of fading also seems to increase with PbO contents up to about 0.75% by weight.

CuO has been observed to have a significant effect upon the temperature dependence of those photochromic glasses wherein the photochromic characteristics are imparted to those glasses through the presence of silver halide-containing crystals. That function of CuO is explained in U.S. applications Ser. Nos. 887,677 and 895,646, supra, and a similar effect is felt in the present invention.

The silver, chloride, and bromide levels are especially vital to the operability of the inventive microsheet with regard to photochromic properties. In the thin cross sections of the microsheet at least the minimum quantities specified of silver and bromide must be present in order to provide sufficient nucleation. Reduced amounts of those ingredients lead to glasses of poor darkenability and which are prone to exhibit haze. With excessive amounts of those components, however, nucleation becomes too great and the glasses do not darken well. High chloride levels are demanded to insure good darkenability in the microsheet. However, chloride appears to increase somewhat the temperature dependence of the glass. Consequently, caution indicates that the chloride concentrations be maintained at such low values as are practically consistent with good darkening character.

The addition of minor amounts of compatible constituents to the base glass compositions is permissible, as was observed above, but is typically avoided because of the likelihood of deleteriously altering the desired combination of photochromic, physical, and chemical properties in the final product. Therefore, whereas alkaline earth and other multivalent metal oxides may be included, no truly substantive improvements in properties have been perceived in so doing, and commonly, such additions tend to increase the liquidus temperature and decrease the long term stability of the glass. An exception to this generalization appears to be CdO which, in small amounts, improves the fading rate of the glass.

$TiO_2$ and $ZrO_2$ will preferably be essentially absent from the glass due to their well-known function as a nucleating agent for crystal growth. As small an amount as 0.8% $ZrO_2$ can initiate zircon crystallization at temperatures in the $10^4$–$10^5$ poise range.

The inclusion of $SnO_2$, $Sb_2O_3$, and/or $As_2O_3$ may be beneficial in modifying the characteristics of the glass melt, especially with respect to the oxidation state thereof.

Table I reports a group of glasses, expressed in terms of parts by weight on the oxide basis as calculated from the batch, illustrating the compositional parameters of the invention. Inasmuch as it is not known with which cation(s) the halides are combined, they are simply reported as halides in accordance with conventional glass analysis practice. The silver content is also tabulated on an elemental basis. The compositions can be prepared from customary glass batch components in such proportions as to yield the desired oxide constituents in the proper amounts. Because the sum of the several ingredients closely approximates 100, for practical purposes the quantity of each may be deemed to be expressed in weight percent. The batch melting may be conducted following conventional glass melting practice in crucibles, pots, tanks, or other melting units at temperatures of about 1200°–1550° C. Nevertheless, where optical quality microsheet is to be made, the downdraw processes described in U.S. Pat. Nos. 3,338,696 and 3,682,609 are particularly applicable.

The microsheet will thereafter be heat treated in accordance with predetermined thermal schedules to develop the desired photochromic behavior therein. In general, with the present glass compositions exposures of the microsheet to temperatures between about 575°–750° C. for periods of time ranging from a few seconds to a few hours have been found to be operable. To obtain the necessary optical surface quality, the glass will be supported during this heat treatment in a manner to preclude surface marking such as, for example, by means of edge supports.

TABLE I

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 60.2 | 60.2 | 60.2 | 60.2 | 59.8 | 59.8 | 59.8 | 60.1 | 60.1 | 59.9 | 59.4 | 59.2 | 60 | 60.0 |
| $Al_2O_3$ | 11.5 | 11.5 | 11.5 | 11.5 | 11.3 | 11.3 | 11.3 | 11.6 | 11.6 | 11.5 | 1.4 | 11.4 | 11.5 | 11.5 |
| $B_2O_3$ | 18.0 | 18.0 | 18.0 | 18.0 | 17.6 | 16.9 | 18.3 | 18.0 | 18.0 | 17.9 | 17.8 | 17.7 | 18.0 | 18.0 |
| $Li_2O$ | 2.0 | 2.0 | 2.0 | 2.0 | 2.0 | 2.0 | 2.0 | 2.0 | 2.0 | 2.0 | 2.0 | 2.0 | 2.0 | 2.0 |
| $Na_2O$ | 5.9 | 5.9 | 5.9 | 5.9 | 5.7 | 6.4 | 5.1 | 5.8 | 5.8 | 5.8 | 5.8 | 5.8 | 5.8 | 5.8 |
| $K_2O$ | 1.6 | 1.6 | 1.6 | 1.6 | 1.6 | 1.6 | 1.6 | 1.6 | 1.6 | 1.6 | 1.6 | 1.6 | 1.6 | 1.6 |
| PbO | 0.47 | 0.47 | 0.47 | 0.47 | 0.5 | 0.5 | 0.5 | 0.5 | 0.5 | 0.78 | 0.46 | 0.77 | 0.61 | 0.61 |
| Ag | — | — | — | — | 1.2 | 1.2 | 1.2 | — | — | — | 1.2 | 1.2 | — | 0.37 |
| Cl | 0.35 | 0.35 | 0.35 | 0.35 | 0.3 | 0.3 | 0.3 | 0.35 | 0.45 | 0.45 | 0.35 | 0.35 | 0.37 | 0.52 |
| Br | 0.75 | 0.75 | 0.5 | 1.2 | 0.75 | 0.75 | 0.75 | 0.75 | 0.75 | 0.75 | 0.75 | 0.75 | 0.52 | 0.2 |
| F | 0.2 | 0.2 | 0.2 | 0.2 | 0.49 | 0.49 | 0.49 | 0.12 | 0.2 | 0.2 | 0.2 | 0.2 | 0.2 | 0.22 |
| CuO | 0.22 | 0.22 | 0.22 | 0.22 | 0.2 | 0.2 | 0.2 | 0.22 | 0.22 | 0.22 | 0.22 | 0.22 | 0.22 | 0.011 |
| CdO | 0.007 | 0.02 | 0.011 | 0.011 | 0.008 | 0.008 | 0.008 | 0.011 | 0.011 | 0.011 | 0.011 | 0.011 | 0.011 | — |

| | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| $SiO_2$ | 59.8 | 60.2 | 59.9 | 59.9 | 60.1 | 60.0 | 60.0 | 60.0 | 60.0 | 60.0 | 60.0 | 60.0 | 60.0 | 60.0 |
| $Al_2O_3$ | 11.5 | 11.5 | 11.5 | 11.5 | 11.5 | 11.4 | 11.4 | 11.4 | 11.4 | 11.4 | 11.4 | 11.4 | 11.4 | 11.4 |
| $B_2O_3$ | 17.9 | 18.0 | 17.9 | 17.9 | 18.0 | 18.0 | 18.0 | 18.0 | 18.0 | 18.0 | 18.0 | 18.0 | 18.0 | 18.0 |
| $Li_2O$ | 2.0 | 2.0 | 2.0 | 2.0 | 2.0 | 2.0 | 2.0 | 2.0 | 2.0 | 2.0 | 2.0 | 2.0 | 2.0 | 2.0 |
| $Na_2O$ | 5.8 | 5.8 | 5.8 | 5.8 | 5.8 | 5.8 | 5.8 | 5.8 | 5.8 | 5.8 | 5.8 | 5.8 | 5.8 | 5.8 |
| $K_2O$ | 1.6 | 1.6 | 1.6 | 1.6 | 1.6 | 1.6 | 1.6 | 1.6 | 1.6 | 1.6 | 1.6 | 1.6 | 1.6 | 1.6 |
| PbO | 1.0 | 0.5 | 0.75 | 0.75 | 0.5 | 0.75 | 0.75 | 0.65 | 0.75 | 0.75 | 0.75 | 0.75 | 0.45 | 0.45 |
| Ag | 0.37 | 0.37 | 0.45 | 0.45 | 0.45 | 0.45 | 0.45 | 0.45 | 0.45 | 0.45 | 0.45 | 0.45 | 0.45 | 0.45 |
| Cl | 0.52 | 0.52 | 0.5 | 0.65 | 0.5 | 0.65 | 0.65 | 0.65 | 0.65 | 0.65 | 0.8 | 0.65 | 0.65 | 0.52 |
| Br | 0.2 | 0.2 | 0.2 | 0.2 | 0.2 | 0.3 | 0.2 | 0.2 | 0.2 | 0.4 | 0.3 | 0.3 | 0.3 | 0.36 |
| F | 0.22 | 0.22 | 0.22 | 0.22 | 0.22 | 0.22 | 0.22 | 0.22 | 0.22 | 0.22 | 0.22 | 0.22 | 0.22 | 0.22 |
| CuO | 0.011 | 0.011 | 0.011 | 0.011 | 0.009 | 0.011 | 0.009 | 0.00 | 0.011 | 0.011 | 0.011 | 0.008 | 0.011 | 0.011 |
| CdO | — | 0.3 | — | — | — | — | — | — | | | | | | |

TABLE I-continued

| | 29 | 30 | 31 | 32 | 33 | 34 |
|---|---|---|---|---|---|---|
| $SiO_2$ | 59.3 | 59.3 | 59.3 | 59.3 | 59.3 | 59.3 |
| $Al_2O_3$ | 17.3 | 17.3 | 17.3 | 17.3 | 17.3 | 17.3 |
| $B_2O_3$ | 11.5 | 11.5 | 11.5 | 11.5 | 11.5 | 11.5 |
| $Li_2O$ | 1.9 | 1.9 | 1.9 | 1.9 | 1.9 | 1.9 |
| $Na_2O$ | 6.6 | 6.6 | 6.6 | 6.6 | 6.6 | 6.6 |
| $K_2O$ | 1.6 | 1.6 | 1.5 | 1.5 | 1.5 | 1.5 |
| PbO | 1.7 | 1.4 | 1.1 | 0.8 | 0.5 | 0.8 |
| Ag | 0.4 | 0.4 | 0.4 | 0.4 | 0.4 | 0.4 |
| Cl | 0.75 | 0.75 | 0.75 | 0.75 | 0.75 | 0.6 |
| Br | 0.6 | 0.6 | 0.6 | 0.6 | 0.6 | 0.6 |
| F | 0.22 | 0.22 | 0.22 | 0.22 | 0.22 | 0.22 |
| CuO | 0.024 | 0.024 | 0.024 | 0.024 | 0.024 | 0.024 |

Each of the above exemplary compositions exhibits a viscosity at the liquidus between about $10^4$–$10^5$ poises, and displays excellent chemical durability in terms of relative inertness to the above-described acidic solutions. Each of the examples also demonstrates long term stability against devitrification when, at viscosities within the $10^4$–$10^5$ range, brought against platinum and refractory ceramic materials. The presence of $Li_2O$ and PbO permits ready adjustment of refractive index to match the plastic member of the composite. (The refractive index of CR-39 ® resin is ~1.504).

Table II records photochromic property data determined at room temperature (~25° C.) on individual samples of microsheet and provides cross sectional measurements of the specimens. Also in the table, $Y_o$ indicates the clear luminous transmittance of the glass (this measurement being taken after an at least eight hour removal from the source of actinic radiation); $Y_{D10}$ represents the darkened luminous transmittance of the glass after a ten minute exposure to the solar simulator darkening source; $Y_{F5}$ designates the luminous transmittance of the glass samples five minutes after removal thereof from exposure to the solar simulator; and $Y_{D10}$-$Y_{F5}$ specifies the amount of fading from the darkened state demonstrated by each specimen after five minutes. This latter value, which has been termed the "5 minute fade" by the art, is useful as a measure of the fade rate of each glass.

TABLE II

| Example No. | $Y_o$ | $Y_{D10}$ | $Y_{F5}$ | $Y_{D10}$-$Y_{F5}$ | Sample Thickness |
|---|---|---|---|---|---|
| 1 | 92% | 47.7% | 73.2% | 25.5% | 0.018" |
| 2 | 92% | 48.5% | 75.5% | 27% | 0.017" |
| 3 | 92% | 49% | 80% | 31% | 0.017" |
| 4 | 92% | 50% | 80% | 30% | 0.018" |
| 5 | 91% | 55% | 78% | 23% | 0.018" |
| 6 | 91% | 55% | 79% | 24% | 0.018" |
| 7 | 91% | 50% | 77% | 27% | 0.018" |
| 8 | 91.8% | 53% | 81% | 29% | 0.016" |
| 9 | 90% | 50% | 75% | 25% | 0.016" |
| 10 | 90% | 48% | 73% | 25% | 0.016" |
| 11 | 90% | 47% | 69% | 22% | 0.016" |
| 12 | 90% | 44% | 67% | 23% | 0.016" |
| 13 | 91% | 44% | 75% | 32% | 0.016" |
| 14 | 92% | 40% | 71% | 31% | 0.018" |
| 15 | 92% | 44% | 66% | 22% | 0.016" |
| 16 | 92% | 48% | 82% | 34% | 0.016" |
| 17 | 91% | 47% | 71% | 24% | 0.016" |
| 18 | 91% | 44% | 69% | 25% | 0.016" |
| 19 | 92% | 45% | 70% | 25% | 0.016" |
| 20 | 91% | 43% | 71% | 28% | 0.017" |
| 21 | 91% | 41% | 68% | 27% | 0.017" |
| 22 | 91% | 48% | 76% | 28% | 0.017" |
| 23 | 91% | 44% | 69% | 25% | 0.016" |
| 24 | 91% | 45% | 74% | 29% | 0.016" |
| 25 | 91% | 46% | 73% | 27% | 0.016" |
| 26 | 90% | 43% | 67% | 24% | 0.016" |
| 27 | 91% | 46% | 74% | 28% | 0.018" |
| 28 | 91% | 48% | 81% | 33% | 0.018" |
| 29 | 92% | 40% | 63% | 23% | 0.018" |
| 30 | 92% | 41% | 64% | 23% | 0.018" |
| 31 | 91% | 43% | 66% | 23% | 0.018" |
| 32 | 91% | 45% | 70% | 25% | 0.018" |
| 33 | 91% | 48% | 75% | 27% | 0.018" |
| 34 | 90% | 45% | 73% | 28% | 0.018" |

A reading of Table I with Table II quickly points up the criticality of glass composition in achieving the desired photochromic properties. Particularly is this true with respect to the "photochromic elements", viz., Ag, Br, and Cl.

For example, at low Ag concentrations (Examples 5, 6, and 7) and low Br levels (Example 8), the glass demonstrates poor darkenability.

We claim:

1. Transparent photochromic glass microsheet demonstrating good chemical durability, a liquidus temperature less than the temperature at which the glass displays a viscosity of $10^5$ poises, a long term stability against devitrification when in contact with platinum and/or refractory ceramics at temperatures corresponding to glass viscosities in the range of about $10^4$–$10^5$ poises, and which, in cross sections between about 0.25–0.5 mm, will exhibit the following photochromic properties:

(a) at room temperature will darken to a luminous transmittance below 50% in the presence of actinic radiation;

(b) at room temperature will fade at least 20 percentage units of transmission after five minutes' removal from the actinic radiation; and (c) at room temperature will fade to a luminous transmittance in excess of 80% in no more than one hour after being removed from the actinic radiation;

said glass consisting essentially, in weight percent on the oxide basis as calculated from the batch, of 54–66% $SiO_2$, 7–15% $Al_2O_3$, 10–30% $B_2O_3$, 3–15% $Na_2O$, 0.4–1.5% PbO, 0.2–0.5% Br, 0.5–1.2% Cl, 0.2–0.5% F, 0.008–02.03% CuO, and >0.03%–1% Ag.

2. Transparent photochromic glass microsheet according to claim 1 wherein said glass composition also contains up to 1% total of transition metal oxides and/or up to 5% total of rare earth oxides as colorants.

3. Transparent photochromic glass microsheet according to claim 1 wherein said glass composition also contains up to 4% $Li_2O$ and up to 10% $K_2O$, the sum of $Li_2O+Na_2O+K_2O$ not exceeding 15%, up to 3% $P_2O_5$, up to 1% I, and up to 0.5% CdO.

4. Transparent photochromic glass microsheet according to claim 1 wherein said glass displays a long term stability against devitrification when in contact with sillimanite, mullite, zircon, and/or high density alumina-containing refractory ceramics.

5. A transparent glass-plastic composite lens having a body portion of plastic and a surface layer and/or an internal lamina buried in said plastic body portion composed of photochromic glass microsheet demonstrating good chemical durability, a liquidus temperature less than the temperature at which the glass displays a viscosity of $10^5$ poises, a long term stability against devitrification when in contact with platinum and/or refractory ceramics at temperatures corresponding to glass viscosities in the range of about $10^4$–$10^5$ poises, and which, in cross sections between about 0.25–0.5 mm, will exhibit the following photochromic properties:

(a) at room temperature will darken to a luminous transmittance below 50% in the presence of actinic radiation;

(b) at room temperature will fade at least 20 percentage units of transmission after five minutes' removal from the actinic radiation; and (c) at room temperature will fade to a luminous transmittance in excess of 80% in no more than one hour after being removed from the actinic radiation;

said glass consisting essentially, in weight percent on the oxide basis as calculated from the batch, of 54–66% $SiO_2$, 7–15% $Al_2O_3$, 10–30% $B_2O_3$, 3–15% $Na_2O$, 0.4–1.5% PbO, 0.2–0.5% Br, 0.5–1.2% Cl, 0.2–0.5% F, 0.008–0.03% CuO, and >0.03%–1% Ag.

6. A transparent glass-plastic composite lens according to claim 5 wherein said glass composition also contains up to 1% total of transition metal oxides and/or up to 5% total of rare earth metal oxides as colorants.

7. A transparent glass-plastic composite lens according to claim 5 wherein said glass composition also contains up to 4% $Li_2O$ and up to 10% $K_2O$, the sum of $Li_2O+Na_2O+K_2O$ not exceeding 15%, up to 3% $P_2O_5$, up to 1% I, and up to 0.5% CdO.

8. A transparent glass-plastic composite lens according to claim 5 wherein said glass displays a long term stability against devitrification when in contact with sillimanite, mullite, zircon, and/or high density aluminacontaining refractory ceramics.

9. A transparent glass-plastic composite lens according to claim 5 wherein said plastic is an allyl diglycol carbonate.

10. A transparent glass-plastic composite lens according to claim 9 wherein said plastic is made from diethylene glycol bis(allyl carbonate) resin.

* * * * *

UNITED STATES PATENT AND TRADEMARK OFFICE
CERTIFICATE OF CORRECTION

PATENT NO. : 4,168,339
DATED : September 18, 1979
INVENTOR(S) : David J. Kerko et al.

It is certified that error appears in the above-identified patent and that said Letters Patent are hereby corrected as shown below:

Column 2, line 9, change "$k_2O$" to --$K_2O$--.

Column 4, line 12, change "(~0.20")" to --(~0.020")--.

Table I, Example 11, $Al_2O_3$, change "1.4" to --11.4--.

Table I, Example 22, CuO, change "0.00" to --0.009--.

Column 12, line 45, change "0.008-02.03% CuO" to --0.008-0.03% CuO--.

Column 12, line 53, change "$Li_2o + Na_2o$" to --$Li_2O + Na_2O$--.

Column 14, line 13, change "aluminacontaining" to --alumina-containing--.

Signed and Sealed this

Fourth Day of March 1980

[SEAL]

Attest:

SIDNEY A. DIAMOND

Attesting Officer  Commissioner of Patents and Trademarks

UNITED STATES PATENT AND TRADEMARK OFFICE
CERTIFICATE OF CORRECTION

PATENT NO. : 4,168,339
DATED : September 18, 1979
INVENTOR(S) : David J. Kerko et al.

It is certified that error appears in the above-identified patent and that said Letters Patent are hereby corrected as shown below:

In Table I, columns 9 and 10, line 50, change "Ag" to --$P_2O_5$--; change "0.37" to -- - --.

In Table I, columns 9 and 10, line 51, change "Cl" to --Ag--; change "0.52" to --0.37--.

In Table I, columns 9 and 10, line 52, change "Br" to --Cl--; change "0.2" to --0.52--.

In Table I, columns 9 and 10, line 53, change "F" to --Br--; change "0.22" to --0.2--.

In Table I, columns 9 and 10, line 54, change "CuO" to --F--; change "0.011" to --0.22--.

In Table I, columns 9 and 10, line 55, change "CdO" to --CuO--; change " - " to --0.011--.

Signed and Sealed this

Sixteenth Day of February 1982

[SEAL]

Attest:

Attesting Officer

GERALD J. MOSSINGHOFF
Commissioner of Patents and Trademarks